United States Patent [19]
Yahav

[11] Patent Number: 5,988,910
[45] Date of Patent: Nov. 23, 1999

[54] EYEGLASS CLEANER

[76] Inventor: Shimon Yahav, 90 Tchernikovsky Street, Rehovot 76503, Israel

[21] Appl. No.: 09/057,691

[22] Filed: Apr. 9, 1998

[30]  Foreign Application Priority Data

Apr. 10, 1997  [IL]  Israel ........................................ 120650

[51] Int. Cl.⁶ .................................................. B05C 17/02
[52] U.S. Cl. ............................... 401/10; 15/214; 206/5.1; 401/124; 401/208
[58] Field of Search ............................. 4/10, 9, 21, 124, 4/123, 208; 15/214; 206/5.1

[56]  References Cited

U.S. PATENT DOCUMENTS

| | | | |
|---|---|---|---|
| D. 315,813 | 3/1991 | Nelson et al. ............................... | D32/1 |
| 1,003,761 | 9/1911 | Lehmann .................................... | 15/214 |
| 2,055,314 | 9/1936 | Seburger ..................................... | 401/10 |
| 2,458,015 | 1/1949 | McDonald ............................. | 401/10 X |
| 2,485,051 | 10/1949 | Joslin .................................... | 70/456 R |
| 2,654,109 | 10/1953 | Barnes ................................... | 401/10 X |
| 2,775,778 | 1/1957 | Mattson ...................................... | 401/10 |
| 2,908,923 | 10/1959 | Schlechter ................................... | 401/10 |
| 3,464,080 | 9/1969 | Certo .......................................... | 15/302 |
| 3,643,279 | 2/1972 | De Bruhl ............................. | 15/104.94 |
| 4,261,688 | 4/1981 | Thomas et al. .......................... | 417/225 |
| 4,347,010 | 8/1982 | Petkoff ....................................... | 401/10 |
| 4,389,132 | 6/1983 | Valadez ..................................... | 401/195 |
| 4,480,352 | 11/1984 | Eggett ....................................... | 15/214 |
| 4,927,284 | 5/1990 | Tsai .......................................... | 401/195 |
| 5,222,268 | 6/1993 | Snodgrass ................................... | 15/29 |

FOREIGN PATENT DOCUMENTS

| | | |
|---|---|---|
| WO 93/03410 | 2/1993 | European Pat. Off. . |
| 2 750 223 | 12/1997 | France . |

Primary Examiner—Henry J. Recla
Assistant Examiner—Kathleen J. Prunner
Attorney, Agent, or Firm—Woodcock Washburn Kurtz Mackiewicz & Norris LLP

[57]  ABSTRACT

This invention discloses an eyeglass cleaning apparatus including a handle, and a pair of lens engaging rollers mounted on the handle, each of the rollers comprising a soft material arranged such that the edges thereof engage the surface of a lens sought to be cleaned.

9 Claims, 3 Drawing Sheets

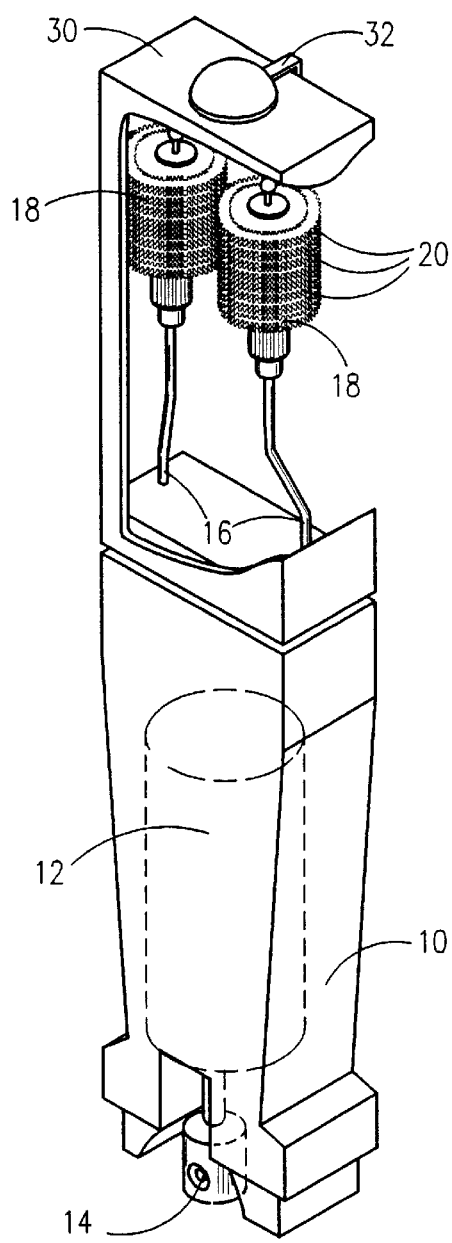
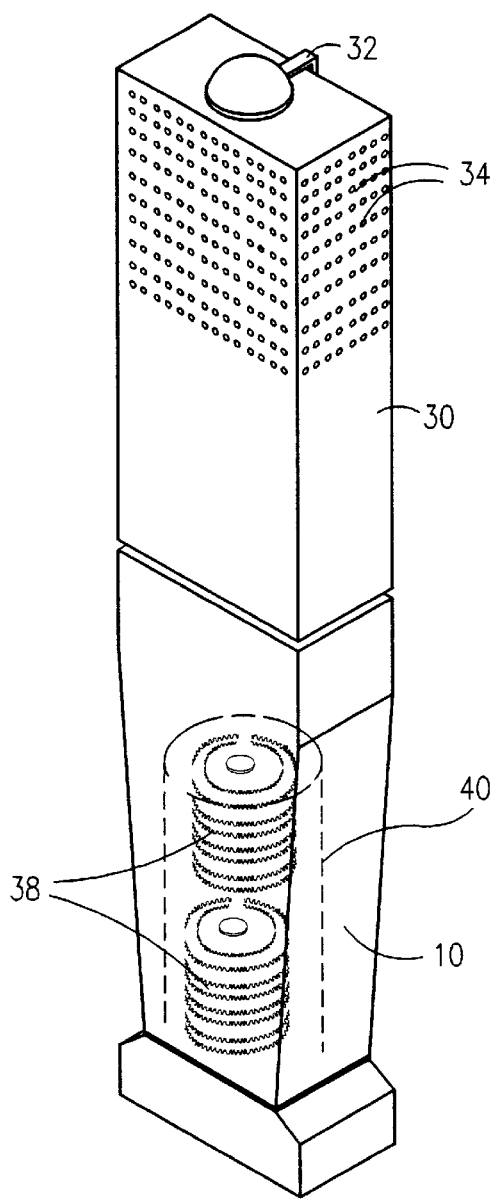

EYEGLASS CLEANER

FIELD OF THE INVENTION

The present invention relates to eyeglass cleaning apparatus generally.

BACKGROUND OF THE INVENTION

Various types of eyeglass cleaning apparatus is known in the patent literature. This apparatus includes both static and motorized wiping apparatus simultaneously engaging both surfaces of a lens. Detergent receptacles and dispensers are also provided in some embodiments.

The following U.S. Patents are believed to represent the state of the art: U.S. Pat. Nos. 3,464,080; 3,643,279; 4,347,010; 4,389,132; 4,480,352; 4,927,284; 5,222,268 and Des. 315,813.

SUMMARY OF THE INVENTION

The present invention seeks to provide improved eyeglass cleaning apparatus.

There is thus provided in accordance with a preferred embodiment of the present invention eyeglass cleaning apparatus including a handle, a pair of lens engaging rollers mounted on the handle and arranged along respective longitudinal axes disposed in generally parallel arrangement, each of the rollers comprising a soft web material arranged such that the edges of the layers engage the surface of a lens sought to be cleaned.

In accordance with a preferred embodiment of the present invention, the two rollers are urged towards each other by a resilient mounting.

Further in accordance with a preferred embodiment of the present invention, the rollers are removably and replaceably mounted onto mounting axles supported by the handle.

Still further in accordance with a preferred embodiment of the present invention, the handle also includes a reservoir for a lens cleaning liquid and a manually actuable dispenser therefor. The dispenser may be a spray dispenser or alternatively a drip-type dispenser.

Preferably, the rollers are formed of material which does not shed loose threads or fibers which could remain on the lenses being cleaned.

Preferably, a cover element is provided for covering the rollers and the mounting axles when the apparatus is not in use and functioning as an elongate handle extension when the apparatus is in use.

Additionally in accordance with a preferred embodiment of the present invention the soft material comprises a web material.

Moreover in accordance with a preferred embodiment to the present invention the handle also includes a receptacle for storing at least one spare roller.

BRIEF DESCRIPTION OF THE DRAWINGS

The present invention will be understood and appreciated more fully from the following detailed description, taken in conjunction with the drawings in which:

FIG. 1 is a simplified, partially cut-away pictorial illustration of eyeglass cleaner apparatus of the present invention in a closed orientation in a stored orientation;

FIG. 4 is an illustration of an alternative embodiment of the present invention.

DETAILED DESCRIPTION OF A PREFERRED EMBODIMENT

Figure 2:
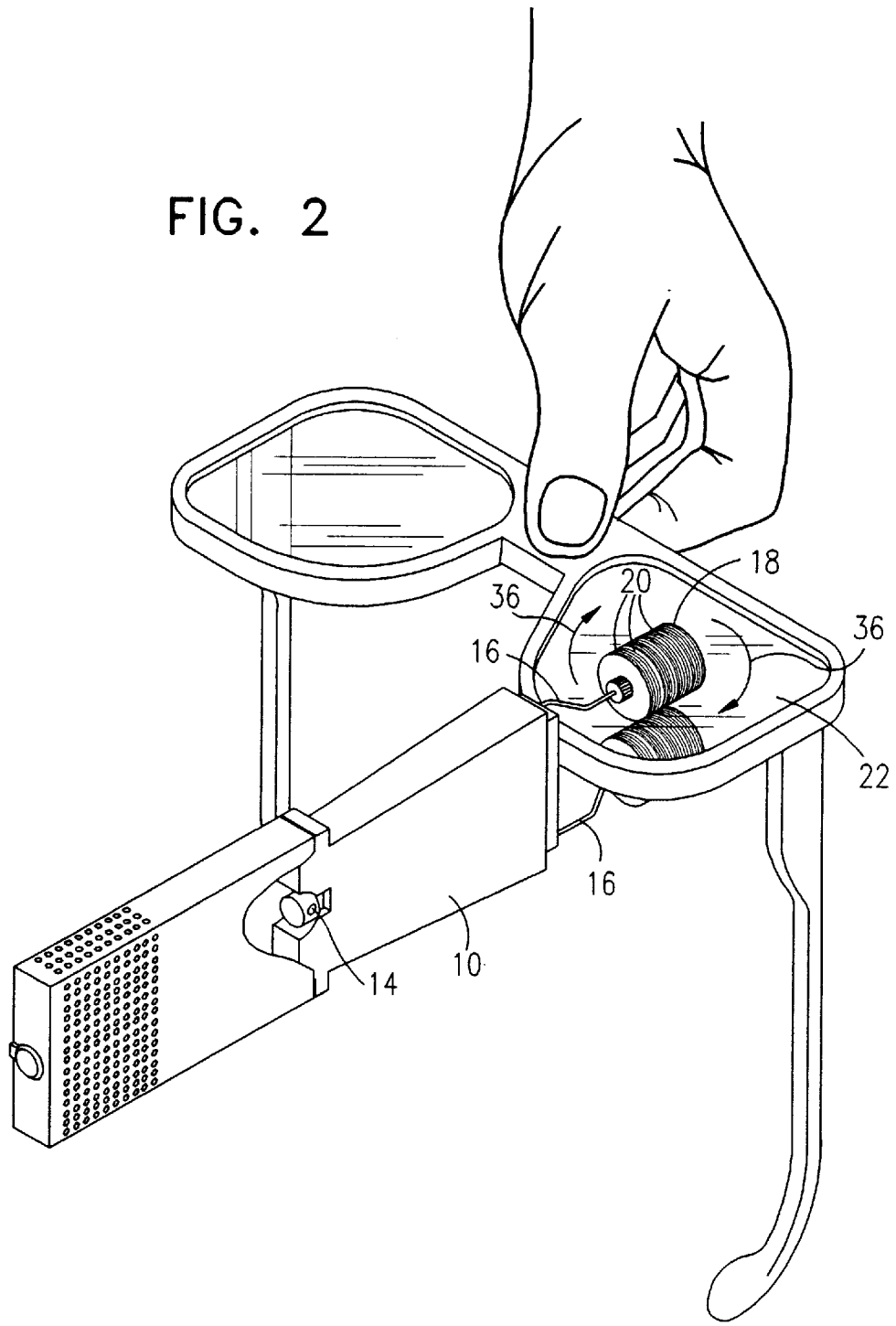
FIG. 2 is a simplified pictorial illustration of the apparatus of FIG. 1 in an operative orientation in engagement with an eyeglass lens to be cleaned.
Figure 3:
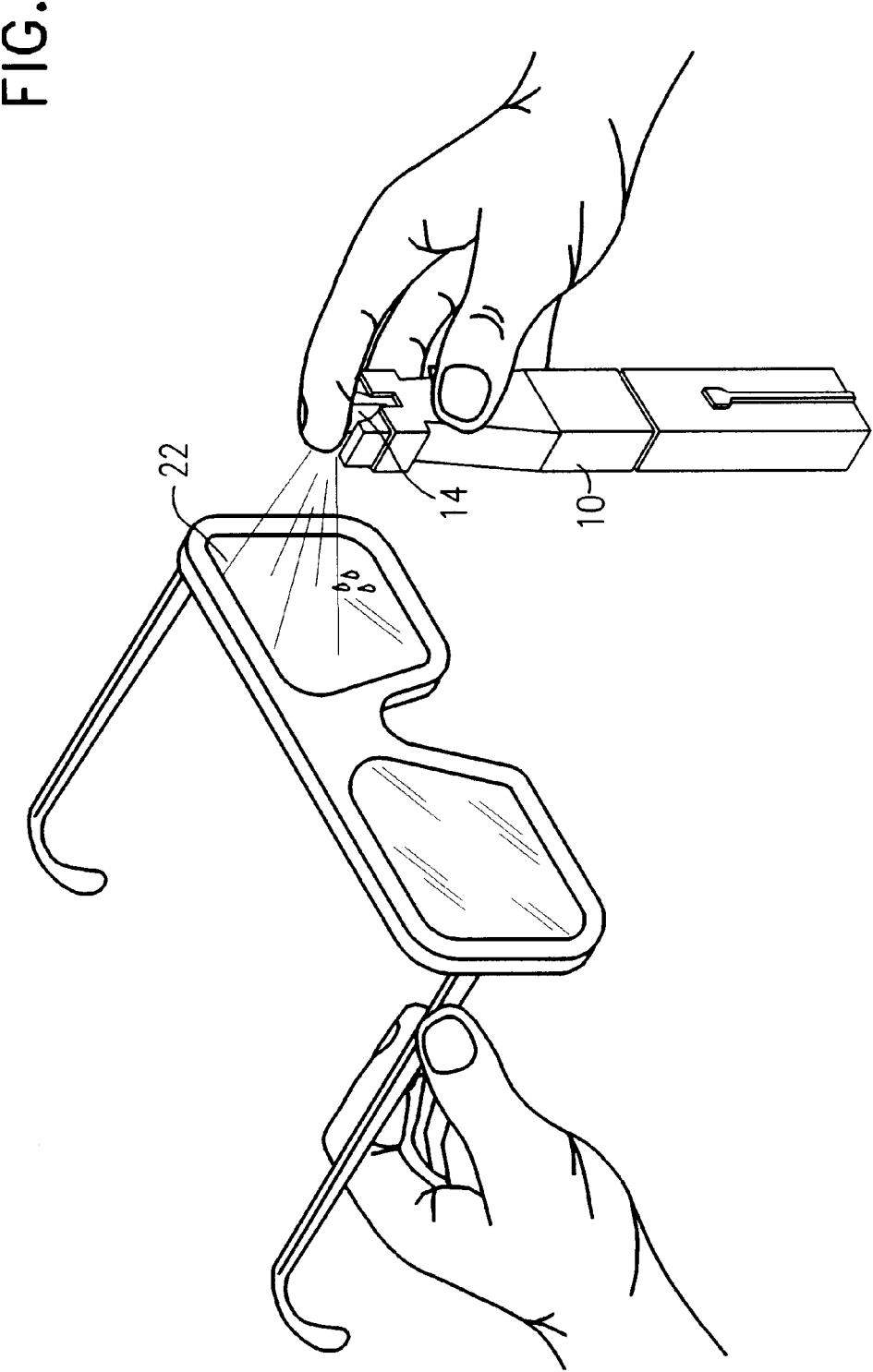
FIG. 3 is an illustration of the apparatus of FIG. 1 in a cleaning liquid dispensing mode of operation.

Reference is now made to FIGS. 1–3, which illustrate apparatus for eyeglass cleaning constructed and operative in accordance with a preferred embodiment of the present invention. The apparatus comprises a handle 10 within which there is preferably formed a reservoir 12 for eyeglass cleaning liquid having an associated manually controllable dispenser 14, providing a spray or drop output as desired.

Mounted on handle 10 are a pair of roller mounting axles 16 onto which are removably and rotatably mounted respective rollers 18. Preferably axles 16 are formed of a spring-like metal and are operative to urge the rollers 18 into touching relationship as shown. The rollers are removably and replaceably retained on axles 16 for easy replacement by the user.

It is a particular feature of the present invention that each roller preferably comprises a stack of layers 20 of a web material such as a non-woven fabric, arranged such that the edges of each layer engage the lens 22 of eyeglasses to be cleaned. Each layer preferably has a generally circular configuration. Preferably the web material is such that it does not "shed" threads, fibers or particles thereof which could remain on the lens to be cleaned.

In accordance with one embodiment of the invention, rollers 18 are generally static and do not rotate as they engage the respective opposite surfaces of an eyeglass lens to be cleaned. The rollers 18 may then be manually rotated about their respective longitudinal axes on axles 16 so as to present clean and dry surfaces for engagement with the lens surfaces. Alternatively, the rollers 18 may be driven in rotation about their longitudinal axes either by friction engagement with the respective lens surfaces or alternatively by a miniature motor (not shown).

Different rollers may be used for cleaning and for drying the lenses and may be readily replaced on axles 16 and removably retained thereon by any suitable mounting mechanism.

FIGS. 1 and 4 illustrate a removable cover member 30 having a pen clip 32 mounted in respective roller covering and spray head covering positions on handle 10. Preferably removable cover member 30 is formed with ventilation apertures 34, to enable the rollers 18 to dry.

FIG. 1 illustrates the eyeglass cleaning apparatus of the invention in a generally closed orientation, suitable for being held in the pocket of a user. It is noted that the dispenser 14 is recessed in handle 10, so as not to be accidentally actuated.

FIG. 3 illustrates the apparatus of FIG. 1 in a spray mode of operation for initially moistening an eyeglass lens to be cleaned.

FIG. 2 illustrates the apparatus of FIG. 1 in a lens cleaning mode of operation wherein rollers 18 rotate as indicated by arrows 36 in engagement with an eyeglass lens for cleaning thereof FIG. 4 illustrates an alternative embodiment of the invention, wherein a liquid dispenser 12 is not provided. In this embodiment, extra rollers 38 are stored in a volume 40 within handle 10.

I claim:

1. Eyeglass cleaning apparatus comprising:

a handle; and a pair of lens engaging rollers mounted on the handle, each of the rollers comprising a plurality of stacked layers of a soft material arranged such that only peripheral edge portions of the stacked layers of both rollers can engage opposing surfaces of a lens sought to be cleaned.

2. Eyeglass cleaning apparatus according to claim 1 and wherein said pair of rollers are arranged along respective longitudinal axes disposed in generally parallel arrangement.

3. Eyeglass cleaning apparatus according to claim 2 and wherein said pair of rollers are urged towards each other by a resilient mounting.

4. Eyeglass cleaning apparatus according to claim 1 and wherein said pair of rollers are urged towards each other by a resilient mounting.

5. Eyeglass cleaning apparatus according to claim 1 and wherein said handle also includes a reservoir for a lens cleaning liquid and a manually actuatable dispenser therefor.

6. Eyeglass cleaning apparatus according to claim 5 and wherein said dispenser is a spray dispenser.

7. Eyeglass cleaning apparatus according to claim 1 and wherein said rollers are formed of material which does not shed loose threads or fibers which could remain on lenses being cleaned.

8. Eyeglass cleaning apparatus according to claim 1 and wherein said handle includes a receptacle for storing at least one spare roller.

9. Eyeglass cleaning apparatus comprising:

a handle;

a pair of lens engaging rollers mounted on the handle, each of the rollers comprising a soft material arranged such that only peripheral edge portions of the material of both rollers engage opposing surfaces of a lense sought to be cleaned; and a cover for covering the rollers when the apparatus is not in use and functioning as an elongate handle extension when the apparatus is in use.

\* \* \* \* \*